United States Patent
Suzuki

(12) 
(10) Patent No.: US 6,396,022 B1
(45) Date of Patent: May 28, 2002

(54) METHOD AND DEVICE FOR REPLACING PIPE ELECTRODE FOR SMALL-HOLE ELECTRIC DISCHARGE MACHINING AND ELECTRODE MAGAZINE

(75) Inventor: Eiji Suzuki, Tokyo (JP)

(73) Assignee: Astec Corporation Limted, Tokyo (JP)

( * ) Notice: Subject to any disclaimer, the term of this patent is extended or adjusted under 35 U.S.C. 154(b) by 0 days.

(21) Appl. No.: 09/647,298

(22) PCT Filed: Aug. 27, 1999

(86) PCT No.: PCT/JP99/04666

§ 371 (c)(1),
(2), (4) Date: Sep. 29, 2000

(87) PCT Pub. No.: WO00/23222

PCT Pub. Date: Apr. 27, 2000

(30) Foreign Application Priority Data

Oct. 16, 1998 (JP) .......................................... 10-314003

(51) Int. Cl.⁷ ................................................ B23H 1/00
(52) U.S. Cl. ................................ 219/69.15; 219/69.11
(58) Field of Search ........................... 219/69.15, 69.14, 219/69.11, 69.17

(56) References Cited

U.S. PATENT DOCUMENTS 4,705,932 A  *  11/1987  Aso et al. ................. 219/69.14
4,996,762 A  *  3/1991   Takayama ................. 219/69.11
6,127,642 A  *  10/2000  Gleason et al. .......... 219/69.15
6,211,480 B1 *  4/2001   Nagata ..................... 219/69.11

FOREIGN PATENT DOCUMENTS

| JP | 58-28055 | 6/1983 |
| JP | 60-108234 | 6/1985 |
| JP | 62-27929 | 6/1987 |
| JP | 1-295723 | 11/1989 |
| JP | 3-287318 | 12/1991 |
| JP | 4-57321 | 5/1992 |
| JP | 5-65292 | 9/1993 |
| JP | 8-229747 | 9/1996 |
| JP | 8-290332 | 11/1996 |
| JP | 9-19830 | 1/1997 |
| JP | 9-136222 | 5/1997 |

* cited by examiner

Primary Examiner—Geoffrey S. Evans

(57) ABSTRACT

A method and device for replacing quickly a pipe electrode small-hole electric discharge machining to make a small-hole in a work by electric discharge machining. To make replacement of a pipe electrode 1, an electrode magazine 5 containing an electrode guide 4 in which the pipe electrode 1 is accommodated is replaced by using means. The electrode magazine 5 has a self-position maintenance tip 8 for maintaining the position taken by the electrode 1 until then while the electrode magazine 5 is removed from the electrode discharge machine and resuming the electrode discharge from the position after the electrode magazine 5 is attached again to the electric discharge machine.

2 Claims, 4 Drawing Sheets

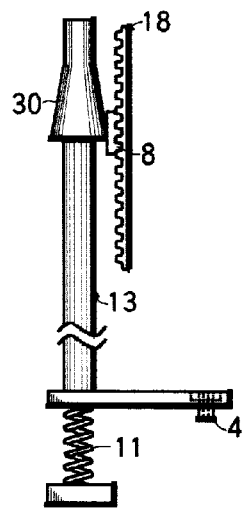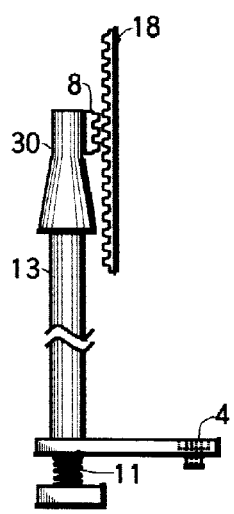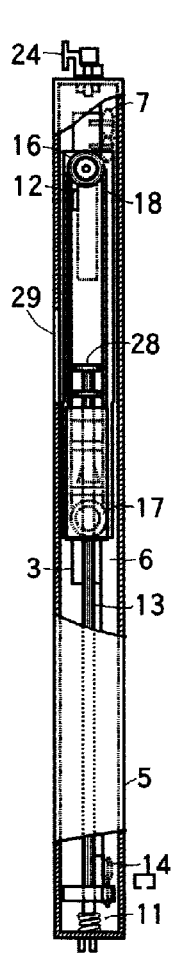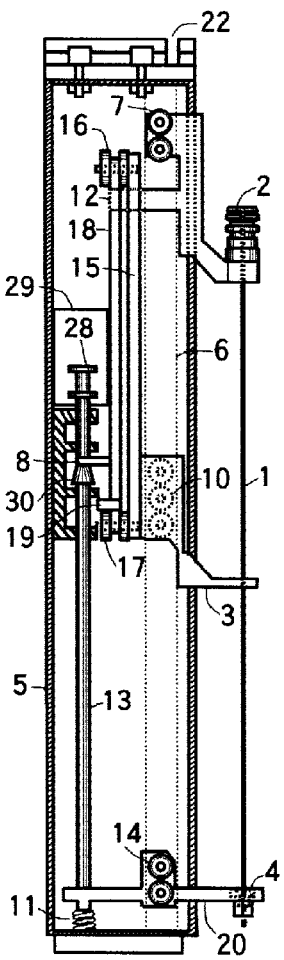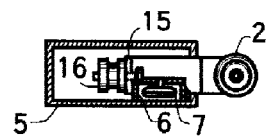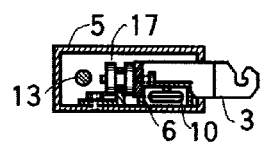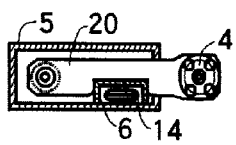

METHOD AND DEVICE FOR REPLACING PIPE ELECTRODE FOR SMALL-HOLE ELECTRIC DISCHARGE MACHINING AND ELECTRODE MAGAZINE

FIELD OF THE INVENTION

This invention relate to a method and device for replacing the pipe electrode for the small-hole electric (electrical) discharge machine, which makes a small-hole on the works by the electric discharge machining.

DESCRIPTION OF THE PRIOR ART

As the prior art which relates to this invention, it is described in Japanese Examined Patent Publication No. 58-28055, Japanese Examined Patent Publication No. 62-27929, Japanese Non-examined Patent Publication No. 3-287318, Japanese Non-examined Utility Patent Publication No. 4-57321, Japanese Examined Patent Publication No. 5-65292, Japanese Non-examined Patent Publication No. 8-290332, Japanese Non-examined Patent Publication No. 9-19830, Japanese Non-examined Patent Publication No. 9-136222 and so on.

In Japanese Examined Patent Publication No. 58-28055, a technology for the electrode replacing by replacing an electrode magazine for normal electric discharge machining is disclosed. However, it is not for a small-hole machining.

In Japanese Examined Patent Publication No. 62-72929, a technology for replacing by plural electrode holder (correspond to the electrode magazine of this invention) is disclosed. However, this technology is not related to the small-hole electric discharge machining that a pipe electrode is used.

In Japanese Non-examined Patent Publication No. 3-287318, a replacing device of the electrode which can be located more precisely and which copes with Flexible Manufacturing System is disclosed by using a board-shaped palette for the chuck.

In Japanese Non-examined Utility Patent Publication No. 4-57321, a technology for replacing a magazine itself is disclosed by using the plural magazine which can store the plural electrode. However, it is difficult to apply for small-hole electric discharge machining, also the magazine and the electrode are not unified.

In Japanese Examined Patent Publication No. 5-65292, a replacing device for the electrode guide by moving the plural electrode guide which have plural different diameter hole straight and horizontally is disclosed, however, it is not a replacement as for an electrode magazine.

In Japanese Non-examined Patent Publication No. 8-229747, an electrode replacing device, which combined with the electrode magazine and an electrode tip guide block, is disclosed.

In Japanese Non-examined Patent Publication No. 8-290332, a technology of the process holding an optional electrode which is picked up from the electrode stock box with the holder to the main shaft chuck, the replacing process of the electrode guide, the electrode replacing device which sets up the plural electrode holder support member in the endless chain which can run in the horizontal direction and which holds an electrode holder with the magnet, the small-hole electric discharge machine equipped the swing prevention guide which has the horizontal groove of the V-shape in cross section, the swing prevention guide can move up and down with the main shaft and can be fixed on the designated position is disclosed.

In Japanese Non-examined Patent Publication No. 9-19830, a technology for the electrode setting device equipped a jig which holds whole electrode holder in the case of making many holes at the same time, setting the plural electrode on the electrode holder is disclosed.

In Japanese Non-examined Patent Publication No. 9-136222, a technology for an automatic replacing of the plural electrode guide by using an electrode guide magazine is disclosed.

The most of these prior electrode magazine is chucked one end of the pipe electrode with collet chuck, and formed as the shape that the part which is close to the other end of the pipe electrode is held or guided. Also, at the time of the pipe electrode replacing, to locate the tip of the electrode precisely on the designated processing point of the work, it is necessary the process of that the tip of the pipe electrode is guided to be inserted in the electrode guide, therefore, a complex moving process and its means were required. Further, to reduce replacing frequency of the electrode, when one tries to use a longer pipe electrode, a thin and long pipe electrode vibrates by the movement at the electrode magazine replacing, he can not proceed to the next guidance insertion process until the standstill of the vibration, therefore, it required longer replacing time and there was a problem that the insertion device had to be prepared.

In view of the above problems of the prior art, it is an object of the present invention to provide a method and a device that the automatic replacing of the pipe electrode is to be performed more rapidly, securely and easily for the small-hole electric discharge machine.

The foregoing and other objects are effected by the invention as will be apparent from the following description and claims taken in connection with the accompanying drawing, forming a part of this application, in which:

DISCLOSURE OF THE INVENTION

The inventor found that the foregoing object could be attained by a method of the replacing the whole electrode magazine which contains an electrode guide which was inserted a pipe electrode, and by using an electric magazine which has a means that the position of the Z-axis direction of the pipe electrode is held when it leaves from the electric discharge machine itself in the replacing of the pipe electrode for the small-hole electric discharge machine which uses an electrode magazine.

This invention will be described in further detail by way of example with reference to the accompanying drawings.

As for the electrode magazine 5 in this invention, to make an automatic replacing of the electrode easily, it is a box shaped body formed by the designated dimension and shape. In the prior, the electrode magazine has a collet chuck which is chucked a pipe electrode, the pipe electrode, and partly, a jig for holding or guiding the near point of the other end of the pipe electrode so that it is removable and mountable.

In the present invention, an electrode guide 4 that was inserted a pipe electrode in addition to the collet chuck 2 and the pipe electrode 1 is mounted on the body. It is obviously different from the described electrode guide magazine in Japanese Non-examined Patent Publication No. 9-136222 in the point that a pipe electrode is inserted into the electrode guide later.

An electrode guide 4 is a guidance part to locate the tip of the pipe electrode 1 precisely in the designated machining part of the work. In prior, it is located on the just top position of the machining part of the work, and originally this is not the object for the replacing.

In the present invention, because of the larger advantage that the pipe electrode can be replaced rapidly and securely, comparing with the demerit that one must prepare for an electrode guide for the pipe electrode replacing in each of the electrode magazines, it mounts the electrode guide 4 too, which was inserted a pipe electrode 1 on the electrode magazine 5.

Generally, because of the outside diameter and the length of the pipe electrode is 0.2 mm to 3 mm, 300 mm to 400 mm respectively, of course when it was chucked one end of the pipe electrode with the collet chuck, even if it was held or guided the other end by some means, the tip of the pipe electrode sometimes comes off the electrode guide when it moves at the replacing because the pipe electrode swings in very big amplitude or is rotated at high speed while the electric discharge is processing. Therefore, it is desirable to equip a swing prevention guide 3. A swing prevention guide 3 is a jig which prevents the vibration for guiding to the almost middle position of the pipe electrode 1 between the collet chuck 2 and the electrode guide 4, and may be a shape indicated in the part of the solid line of the FIG. 1A and FIG. 1B.

It is desirable to adopt the means which almost locates a swing prevention guide 3 automatically in the middle position of the pipe electrode 1 between the collet chuck 2 and the electrode guide 4. A mechanism which consists of the combinations of the belt and the pulley that shows in the FIG. 2A and FIG. 2B is desirable as an example. As the first relation of the mutual position to set a pipe electrode, one end of the belt 18 near the lower pulley 17 is fixed on the magazine body, a fixed part for the collet chuck 2 is attached in the opposition side of the belt near the upper pulley 16, by fixing the rear side of the swing prevention guide 3 near the low part of the movement pulley base 15, and by the principle of the pulley, the swing prevention guide is able to descend only half of the descending distances of the collet chuck 2 which follows the consumption of the pipe electrode 1.

The distance between the upper pulley 16 and the lower pulley 17 may be more than half of the length of the pipe electrode 1 which is set on.

The collet chuck 2 in the electrode magazine 5 descends depend on the consumption of the pipe electrode 1 to the Z-axis direction while the electric discharge is processed. These control can be applied the prior technology such as detecting the electric discharge current so that it is controlled.

When a specific electrode magazine leaves from the electric discharge machine itself, as a means of the present invention of always maintenance the Z-axis position information on the way to process works within the electrode magazine, it is desirable to have the mechanism such an example shown in the FIG. 4A and FIG. 4B.

It is the mechanism that the Z-axis position information at that time is held by pressing the belt 18 against the electrode magazine body through the self-position maintenance chip 8 so that the movement pulley base 15 does not move when the electrode magazine 5 leaves from the electric discharge machine itself, and the self-maintenance chip 8 becomes free from the belt 18 when the electrode magazine 5 is attached and locked to the electric discharge machine itself The prior technology such as an electric charging means to the pipe electrode 1, an injection means of the processing liquid to the pipe electrode 1, an insulation means between the pipe electrode 1 and other members, the general means which is applicable to use small-hole electric discharge machining in prior arts, and picking up means from the magazine rack of the electrode magazine 5, the attaching and the removing means to the electric discharge machine and the mechanical movement means such as storage to the magazine rack 23 may be applied to the present invention.

According to the present invention, by preparing plural electrode magazine 5 including the electrode guide 4 inserted a pipe electrode 1 in advance on the magazine rack 23, the replacing of the pipe electrode 1 can be performed easily and securely by replacing of the electrode magazine 5.

Also, the insertion process of the pipe electrode 1 to the electrode guide 4 after the replacing of electrode magazine 5 is unnecessary.

Further, when the electric discharge machining resume, the process of position fitting of the pipe electrode 1 becomes unnecessary by having the mechanism which holds the Z-axis position information on the way to process works in the electrode magazine 5 of the present invention.

BRIEF DESCRIPTION OF THE DRAWINGS

FIG. 4 is the schematic view of an example of the self-position maintenance mechanism in the Z-axis direction in the electrode magazine of the present invention.

FIG. 4A shows situation of locking the electrode magazine when it leaves from the body lock base, and FIG. 4B shows the situation of lock-free when the electrode magazine is attached to the body lock base.

FIG. 5A is the front schematic view of an example of the electrode magazine of the present invention, and FIG. 5B is its schematic side view.

FIG. 6A, 6B and 6C are the arrow direction section schematic views of each main part of electrode magazine of FIG. 5.

BEST MODE OF CARRYING OUT THE INVENTION

Figure 1A:
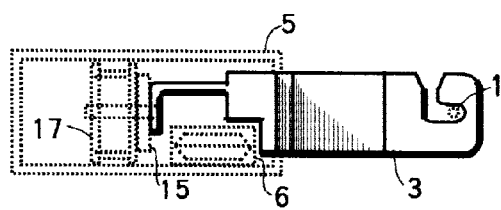
FIG. 1A is the front schematic view of an example of the desirable swing prevention guide.

FIG. 5 is the schematic view of the electrode magazine that corresponds to as an embodiment of carrying out the present invention. In FIG. 5A and 5B, the pipe electrode 1 is chucked by a collet chuck 2, and attached to the electrode magazine 5 under the situation that it is inserted into the electrode guide 4 through the swing prevention guide 3. The collet chuck 2 can be moved to the up-down direction through two rollers 7 for the collet chuck in the rail guide 6 setting inside of the electrode magazine 5. The collet chuck 2 moves downward depend on the consumption of the pipe electrode 1, and also has a mechanism to be connected attachable and removable with the chuck holder 9 of the main shaft of the electric discharge machine.

The collet chuck 2 may be a shape for holding the pipe electrode 1 in the center by adopting a mechanism and using a material as well known.

The swing prevention guide 3 is mounted to be movable through three rollers 10 for the swing prevention guide on the rail guide 6 to the up-down direction. And, by an automatic locating mechanism which is always located near the middle position between the collet chuck 2 and the electrode guide 4, it descends half of the distances of the amount of descent of the collet chuck 2 due to the consumption of the pipe electrode 1, as hereinafter described.

Figure 1B:
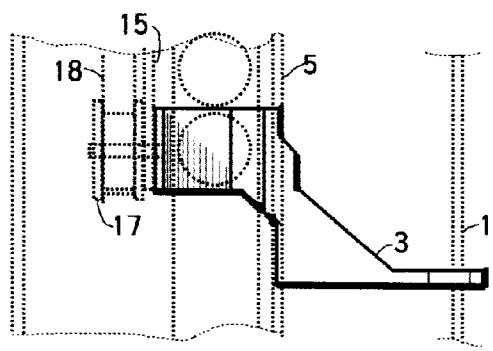
FIG. 1B is its schematic side view.
Figure 2A:
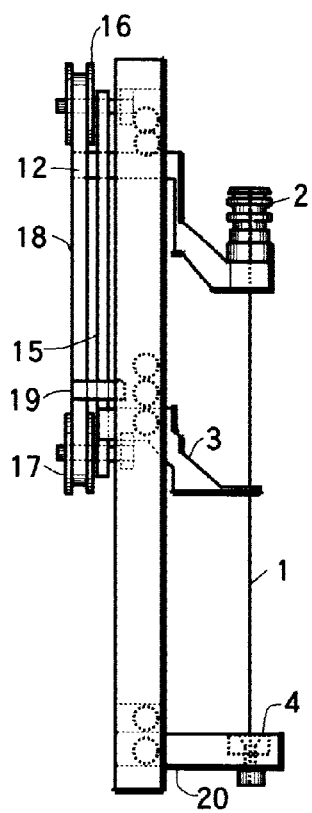
FIG. 2A is the schematic side view of an example of a desirable mechanism to position automatically.
Figure 2B:
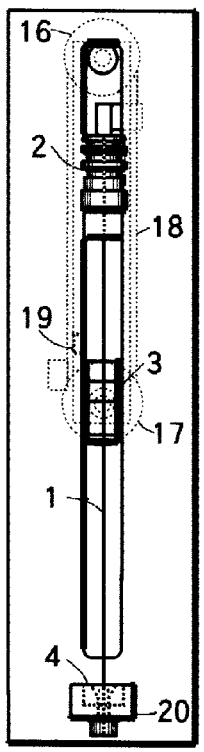
FIG. 2B is its front schematic view.
Figure 3:
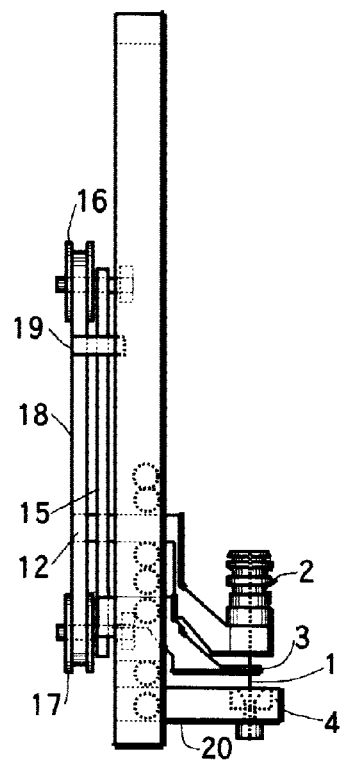
FIG. 3 is a schematic side view after the electrode consumption compared with FIG. 2A.

The shape of the swing prevention guide 3 may be the example such as shown in FIG. 1A and 1B, also may be another shape if it has the same function and the same mechanism.

The material of the swing prevention guide 3 is desirable a plastic such as polyacetal or nylon which has a slip characteristics.

The electrode guide 4 is desirable to be mounted on the electrode guide base 20 as attachable and removable, the electrode guide base 20 is mounted through two rollers 14 for the electrode guide on the rail guide 6 so that it moves to the up-down direction. Usually, the position is fixed during the electric discharge machining except when a pipe electrode 1 is inserting and when the electrode guide is dropped to the electrode guide positioned hole (not illustrated).

The electrode guide 4 may be a shape such as that it has the funnel shape space section and it is able to guide and insert the pipe electrode 1, and may be a material, as well known.

Near the both ends of the movement pulley base 15, an upper pulley 16, a lower pulley 17 are mounted, they compose an automatic positioning mechanism including the pulley belt 18 between the pulleys and the pulley belt fixing part 19 which fixes one end of the pulley belt 18 on the electrode magazine 5.

The rear side of the collet chuck 2 is connected with the pulley belt connection part 12 of the pulley belt 18 on the opposition side of the pulley belt fixing part 19. The rear side of the swing prevention guide 3 is connected with the movement pulley base 15 of about half of the length of the pipe electrodes 1 at the position near the lower pulley 17.

Also, by the self-position maintenance chip 8, the position information of the Z-axis on the way of the processing on this electrode magazine is held when the electrode magazine leaves from the electric discharge machine itself, as hereinafter described.

The mutual position of each members are, the movement pulley base 15 is the almost top of the inside of the electrode magazine 5 when the pipe electrode 1 is attached at the first, the rear of the collet chuck 2 is the almost top of the one end of the pulley belt 18, the rear side of the swing prevention guide 3 is fixed on the movement pulley base 15 in a part for a swing prevention guide 3 to be located exactly in the middle between the collet chuck 2 and the electrode guide 4.

At that time, the pulley belt fixed part 19 is desirable having the relations which fixed on the near of the just top of the lower pulley 17.

According to the consumption of the pipe electrode 1, the descending movement of the collet chuck 2 is united with the pulley belt 18 on the opposition side of the pulley belt fixed part 19, as for the movement pulley base 15 descends the half of the distances in the same way as the relations between the pulley and the belt, the swing prevention guide 3 fixed on the movement pulley base 15 descends the half of the distances of the descending quantity (in other words, the consumption length of the pipe electrode) of the collet chuck 2, the position always become the center between the collet chuck 2 and the electrode guide 4.

The pulley belt 18 is desirable as so-called "timing belt" for the movement of the movement pulley base 15 (in other words, the movement of the swing prevention guide) and for the viewpoint of the follow and the reappearance about the self-position maintenance.

The electrode magazine 5 is formed by a metal material, and is desirable the shape shown in FIG. 5A, 5B and FIG. 6A, 6B and 6C.

The T-shape in cross section rail which is conformed to the C-shape in cross section rail 21 of the body lock base 31 at the top of the electrode magazine 5, as for be able to attach and remove on the constant position of main shaft of the electric discharge machine and the latch 22 are formed to confirm the fixed position, and the U-shape in cross section rail which is conformed to the L-shape in cross section rail of the body lock base 31 and the electrode magazine replacing slider 25 is formed in the bottom part of the electrode magazine 5.

Also, it has the structure that the plural electrode magazine 5 is stored into the magazine rack 23 so that it can slide.

When the electrode magazine 5 is attached and locked to the electric discharge machine itself, the tip of the air cylinder 27 in lock base 31 of the electric discharge machine is inserted through a cam mechanism from the rear window 29 of the electrode magazine 5 by the air pressure, the connection stick 13 connected with the connector 28 is pushed down downward, the electrode guide 4 with the electrode guide base 20 is inserted into the electrode guide positioned hole (not illustrated) of the electric discharge machine.

Figure 8A:
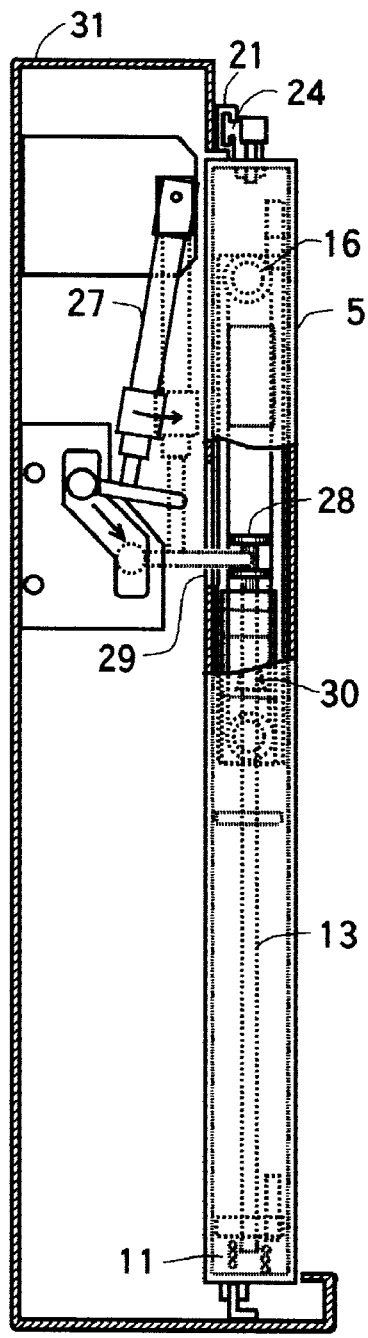
FIG. 8A is the front schematic view of an example of the mechanism which should make free the self-position maintenance mechanism by the electrode guide is inserted into the electrode guide position hole at the same time when the electrode magazine of the present invention is locked by the electric discharge machine itself.
Figure 8B:
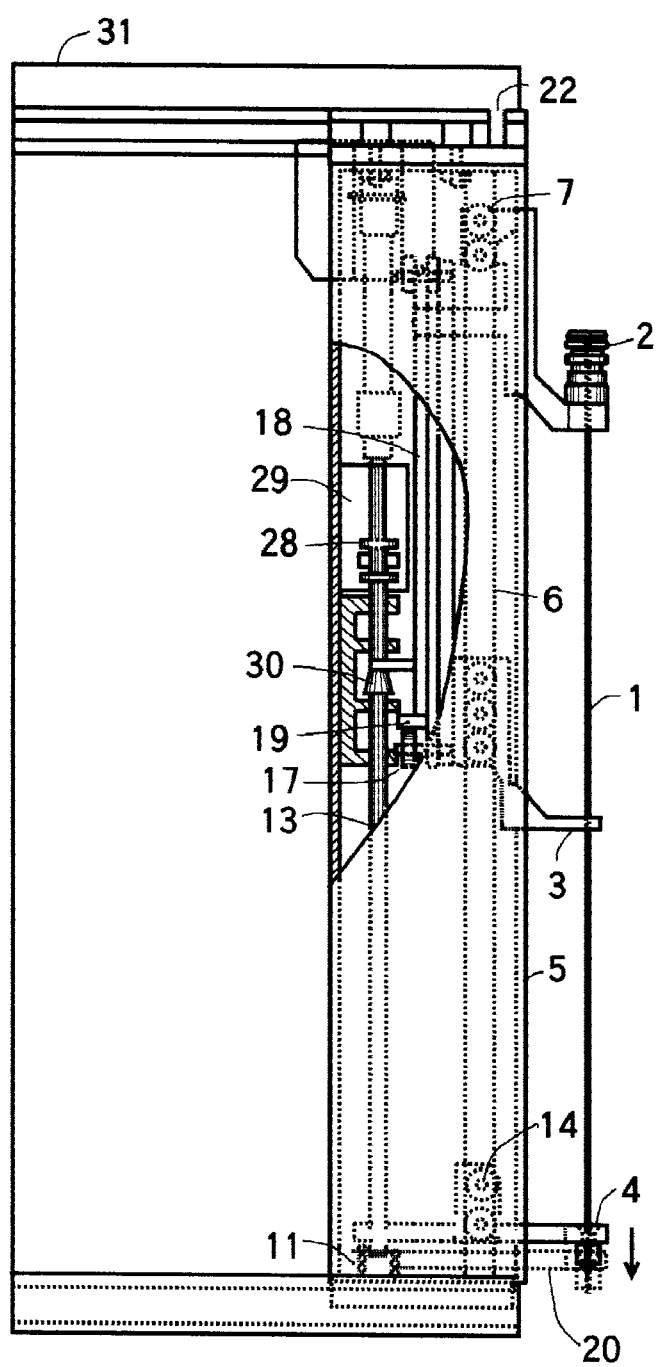
FIG. 8B is its schematic side view.

At the same time, the self-position maintenance tip 8 which forced belt 18 on the electrode guide body leaves from the belt 18 by the taper cam 30, the movement pulley base 15 becomes possible to move as to interlock with the movement of collet chuck 2. Also, the chuck holder 9 of the electric discharge machine itself locks the collet chuck 2. About the cam mechanism of the tip of the air cylinder 27 which is mounted on the body lock base 31 and the movement of the connector 28 is shown in FIG. 8A, 8B.

The electrode magazine replacing device of the present invention is desirable by comprising the magazine rack 23 which is set the plural electrode magazine 5, the servo motor 37 which moves the magazine rack 23 toward the longer direction on the magazine holder 25 and the servo motor 36 which moves the applicable electrode magazine 5 toward the cross direction against the long direction of the magazine rack 23 to remove the exhausted electrode magazine 5 from the electric discharge machine itself and to mount the new electrode magazine 5 on the magazine replacing slider 25.

Figure 7:
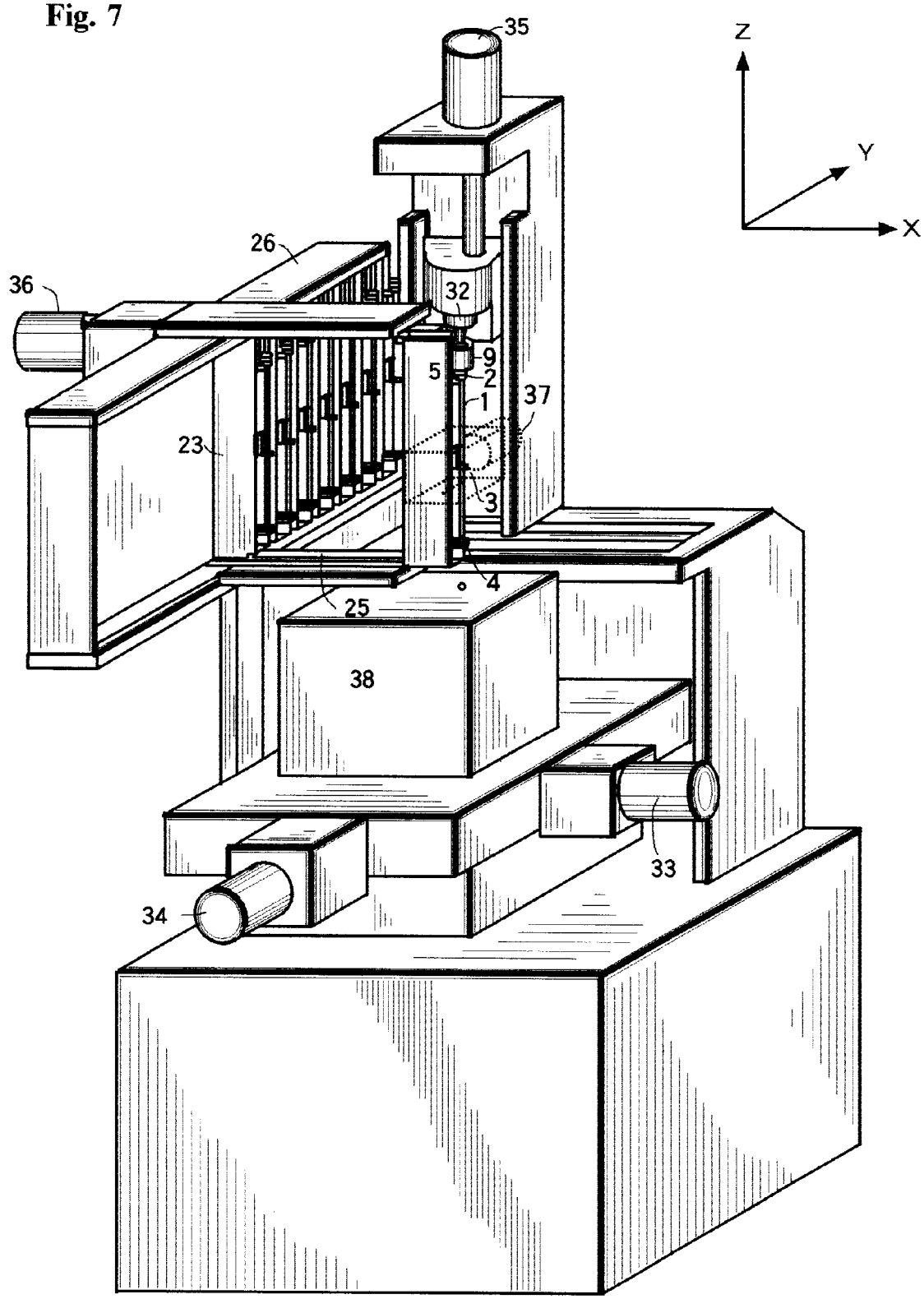
FIG. 7 is the appearance schematic view of the electric discharge machine of building up an example of the pipe electrode replacing device of the present invention.

FIG. 7 is the schematic view of an embodiment of the present invention that a pipe electrode replacing device for the small-hole electric discharge machine was installed in the electric discharge machine.

In FIG. 7, 32 is the motor for the main shaft revolution, 35 is the servo motor for setting the position toward the Z-axis direction between the main shaft and the work 38, 34 is the servo motor for setting the position toward the Y-axis direction between the main shaft and the work, 33 is the servo motor for setting the position toward the X-axis direction between the main shaft and the work, 36 is the servo motor which make to align the center axis of the collet chuck 2 and the center axis of the chuck holder 9 of the main shaft of the electric discharge machine by moving the electrode magazine 5 toward the cross direction (X-axis direction) against the long direction of the magazine rack 23 on the electrode magazine replacing slider 25, and 37 (dotted line) is the servomotor which make to move the plural electrode magazine in the magazine rack 23 toward the long direction (Y-axis direction) of the magazine rack 23.

The prior arts corresponding general control means for small-hole electric discharge machine such as the mechanical control of positioning, the electrical control of electric discharge machining itself, the method of the injection of the processing liquid to the pipe electrode, and the computer control system of each of them or unified them are able to apply for the present invention as well.

INDUSTRIAL APPLICABILITY

According to the present invention, by preparing the plural electrode magazine comprising the collet chuck which held a pipe electrode in advance, a pipe electrode, a swing prevention guide and the electrode guide, in the magazine rack, when the necessity of the electrode replacing is occurred, if above electrode magazine is replaced, electric discharge machining can be resumed without an insertion process to the electrode guide of the pipe electrode.

Also, if the machining is stopped by some reasons and to be resumed, electric discharge machining can be resumed from a position to be as it is, because the electrode magazine holds the Z-axis position information of the collet chuck in it.

What is claimed is:

1. A method for replacing a pipe electrode in an electric discharge machine comprising: replacing an electrode magazine, said electrode magazine comprising an electrode guide through which is inserted said pipe electrode.

2. An electrode magazine for holding pipe electrodes used in a small hole electric discharge machine, the electrode magazine comprising an electrode guide, and means for maintaining the position information of the vertical direction according to the consumption of a pipe electrode when said electrode magazine is removed from the small-hole electric discharge machine.

* * * * *